United States Patent [19]
Dewan

[11] 3,861,211
[45] Jan. 21, 1975

[54] ULTRA-LOW FLOW VELOCITY CURRENT METER

[75] Inventor: Rajinder N. Dewan, Suitland, Md.

[73] Assignee: The United States of America as represented by the Secretary of the Navy, Washington, D.C.

[22] Filed: Mar. 25, 1974

[21] Appl. No.: 454,504

[52] U.S. Cl. .............................. 73/194 A, 73/170 A
[51] Int. Cl. ............................................... G01f 1/00
[58] Field of Search .............. 73/194 A, 189, 170 A

[56] References Cited
UNITED STATES PATENTS
| | | | |
|---|---|---|---|
| 2,480,646 | 8/1949 | Grabau | 73/194 A |
| 3,246,514 | 4/1966 | Gremlitz et al. | 73/189 |
| 3,435,677 | 4/1969 | Gardner | 73/189 |

FOREIGN PATENTS OR APPLICATIONS
| | | | |
|---|---|---|---|
| 616,794 | 1/1949 | Great Britain | 73/194 A |

Primary Examiner—Charles A. Ruehl
Attorney, Agent, or Firm—R. S. Sciascia; Arthur L. Branning; Melvin L. Crane

[57] ABSTRACT

This invention relates to the use of an acoustic signal to determine current velocity of water. The device makes use of a centrally single positioned transducer with four equispaced receivers equi-distant from the transducer. A carrier frequency with two different modulator frequencies are directed to the transducer and the receivers receive the transmitted pulses through the water current. The velocity of the water is determined by measuring the phase angle of the different signals that pass through the water and which are received by the receivers. The different signals permits one to determine the velocity of the water.

4 Claims, 2 Drawing Figures

ULTRA-LOW FLOW VELOCITY CURRENT METER

BACKGROUND OF THE INVENTION

This invention relates to a water current velocity determining system and more particularly to an acoustic signal type for determining velocities on the order of 0.01 knots and up to maximum flow velocity.

Heretofore acoustic signals have been used for determining moderate flow currents. Such systems include doppler devices, multisource acoustic signal devices, as well as reflective signal type devices. None of the prior art systems are known to measure ultra low flow current velocities as well as high current velocities in an open environment such as in the ocean or other such waters.

SUMMARY OF THE INVENTION

This device includes a single x-y plane omnidirectional transducer which directs acoustical energy to two separate pairs of receivers each positioned on different retactable arms 90° apart which extend outwardly to position the receivers one meter from the transducer. The velocity of the current is determined by the amount of phase shift in the acoustical signal received by the receivers. The phase shift is due to the travel of the sound waves through the water and the phase difference between the transmitted and received signal determines the velocity of the current. The amount of the phase difference is due to the amount of time to complete the trip from the transducer to the receiver. The time difference depends on the velocity and direction of the flow of the water. Therefore, a determination of the phase difference in the transmitted and received signals will determine the velocity of the current flow.

Once the water current velocity causes a phase shift greater than 360° the electronics will be unable to determine in which quadrant or cycle the phase shift is taking place. Therefore, every time a phase shift of 360° or an equivalent change of current velocity of 0.4359 knots at a sound speed of 1,498 meters per second takes place a means of cycle count record keeping must be incorporated. For this purpose additional frequencies are modulated for use with the transmitter or transducer. The additional frequencies being generated by a master oscillator to provide coherence. For example, a second frequency of $10^5$Hz which is modulated with a $10^7$Hz carrier frequency will contain 100 cycles of carrier frequency per cycle. Therefore a phase shift of 360° of the second frequency will mean that the water current velocity has changed by 43.6 knots. The phase shift angle may be determined to ±1°. This is equivalent to ±0.3 cycles of carrier frequency on the second frequency of $10^5$Hz, or ±0.1 knots. Therefore the second frequency will keep track of the cycle count between 0.1 and 43.6 knots. The higher frequency will keep track of a change in current velocity from 0.001 knots to 0.1 knots.

The use of a third frequency of $10^3$Hz is used for cycle record count, record keeping up to the theoretical speed of sound in ocean water. However if the maximum water current velocity measurement is 43.6 knots the use of the third frequency is not necessary.

DESCRIPTION OF THE DEVICE

Figure 1:
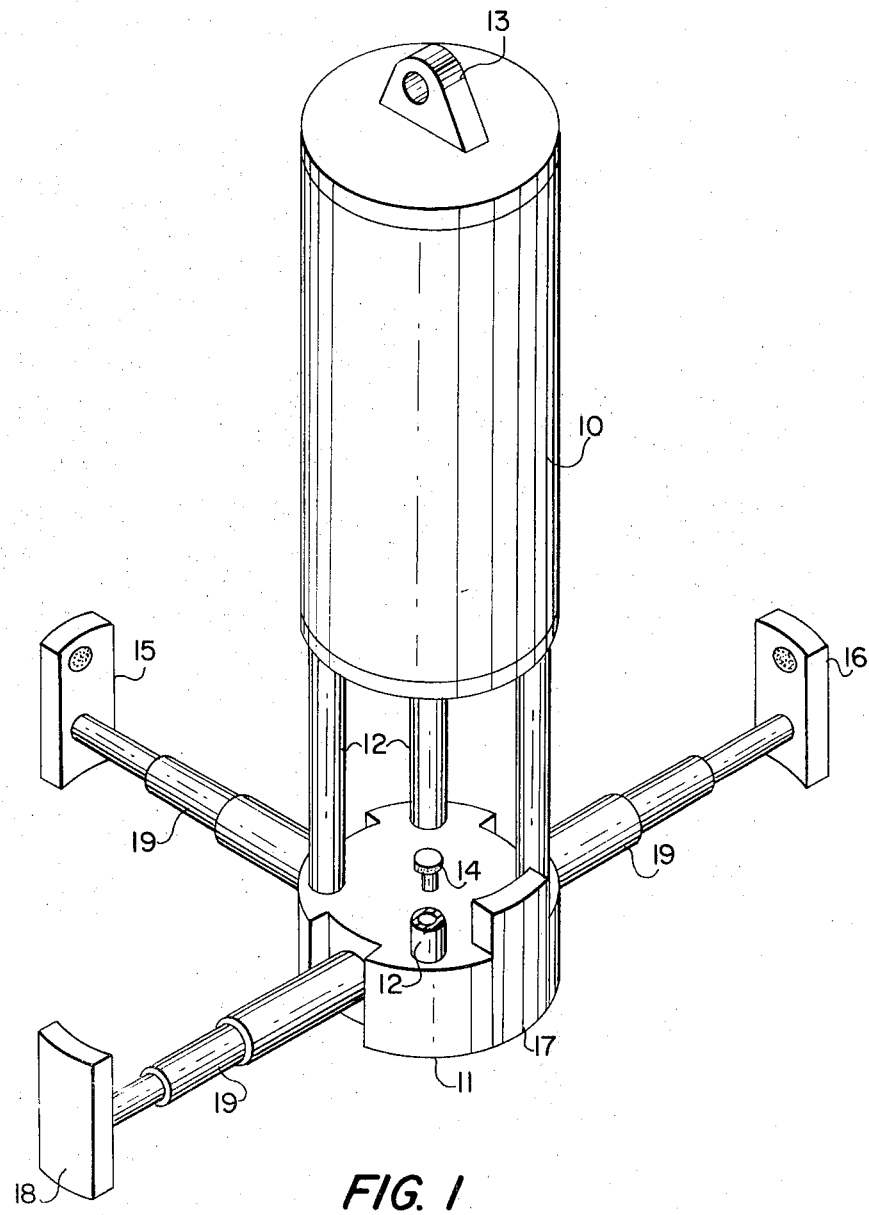
FIG. 1 illustrates an isometric view of the device illustrating the relative elements.

Now referring to the drawings there is shown in FIG. 1 an isometric view of the device illustrating the various parts. As shown, the device includes an upper compartment 10 and a lower compartment 11 joined together by tubular elements 12 through which electrical conductors are passed from one compartment to the other. The upper and lower compartment includes therein appropriate electronic circuitry, controls and mechanical elements for carrying out the invention. The upper compartment has a hoop eye bolt, or bail 13 secured thereto at its upper end in order to lower or lift the device as desired. The upper compartment includes the majority of the electrical components and controls for operation of the device. The lower compartment is provided with an x-y omnidirectional crystal or transducer 14 which radiates acoustical waves outwardly there from to two orthogonal pair of receivers 15-18. The receivers are secured upon telescoping arms 19 which may be extended from a storage position inset within the lower compartment, as shown by receiver 17, out to an operable position one meter length from the crystal. Any suitable means well known in the art may be used for positioning the receivers into place.

Figure 2:
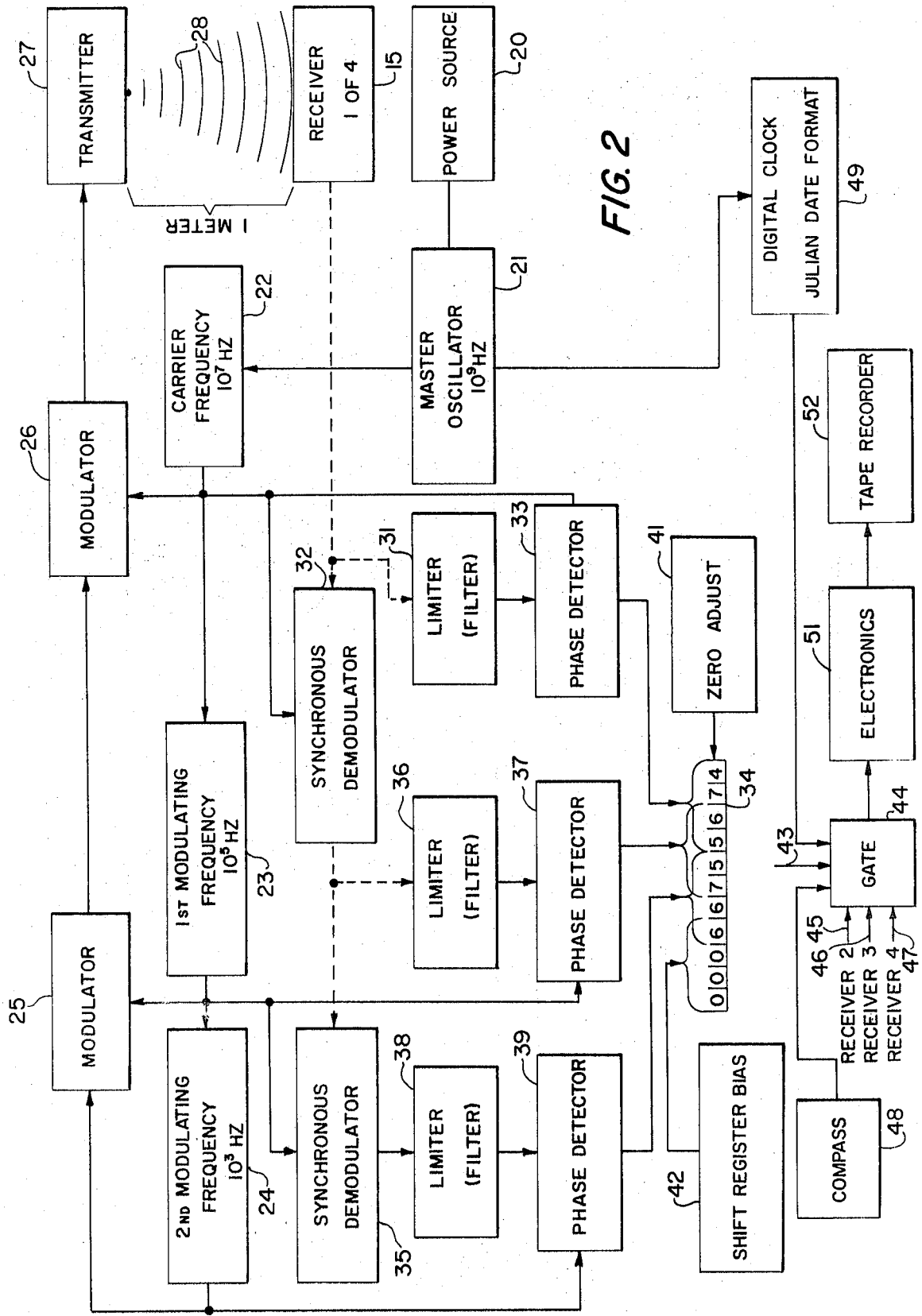
FIG. 2 is a block diagram of the electrical elements necessary to carry out the intended operation of the various elements.

FIG. 2 illustrates in block diagram the necessary electronics and controls for carrying out the operation of the device. The upper compartment is water tight and includes a power source 20 for supplying the necessary current for operation of the various components. Block 21 represents a master oscillator capable of producing an output frequency of $10^9$Hz. The oscillator is housed within a temperature controlled chamber of any well known type in order to keep accuracies within a few parts per billion. The output from the master oscillator is directed to an electrical circuit 22 which produces a carrier frequency of $10^7$Hz, a sub-harmonic which is derived from the master oscillator. The output from the carrier frequency circuitry is directed to an electrical circuitry 23 which produces a first modulating frequency of $10^5$Hz, a subharmonic which is derived from the carrier frequency. From the first modulating frequency circuit 23, the output is directed by a second modulating frequency circuit 24 which produces a frequency of $10^3$Hz, a subharmonic which is derived from the first modulating frequency. The circuitry includes a first amplitude modulator 25 with inputs from the first and second modulating frequency circuits 23,24. The output signal from the first amplitude modulator 25 is the sub-carrier frequency of $10^5$Hz modulated by the $10^3$Hz frequency. The output of the first amplitude modulator is directed into the second amplitude modulator 26 which also has an input from the carrier frequency. The output of the second amplitude modulator is the carrier frequency of $10^7$Hz with double amplitude modulation of $10^5$Hz and $10^3$Hz. This output is fed into a transducer 27 which causes the transducer to radiate an omnidirectional sonic signal 28 in the x-y plane into the surrounding medium. The signal is radiated to the four receivers 15-18 which converts the sound signals to appropriate electrical signals. The electrical signal outputs are fed into a limiter-filter 31 and a synchronous demodulator 32. A signal from the carrier frequency 22 is also directed into the synchronous demodulator 32.

The limiter filter 31 removes the double amplitude modulation from the received carrier frequency while passing the unmodulated carrier frequency of $10^7$Hz. The unmodulated carrier frequency is directed into a first phase detector 33 which also has an input from the carrier frequency. The first phase detector makes a phase comparison between the two signals and produces an output of the cycle difference which will be a cycle count in the hundredths units. The cycle count output of the first phase detector 33 is directed to a phase shift register 34 which indicates the cycle difference count determined by the first phase detector. The first synchronous demodulator 32 receives the originally produced carrier frequency of $10^7$Hz and the signal from the receiver. The first modulating frequency of $10^5$Hz and the sub-carrier frequency of $10^3$Hz are recovered by hetrodyning the two input signals. The output signal from the first synchronous demodulator 32 is directed to a second synchronous demodulator 35 and to a second limiter-filter 36. The second limiter-filter removes the amplitude modulation of $10^3$Hz frequency from the subcarrier frequency of $10^5$Hz. The output from the second limiter-filter is the unmodulated carrier frequency of $10^5$Hz which is fed into a second phase detector 37. The second phase detector 37 also receives a signal from the first modulating frequency of $10^5$Hz, makes a phase comparison between the two input signals and produces a cyclic count of the difference. The cyclic count is directed to the phase shift register 34.

The second synchronous demodulator 35 receives a signal from the first synchronous demodulator 32 and from the first modulating frequency 23. The second modulating frequency of $10^3$Hz is recovered by hetrodyning the two input frequencies. The output of $10^3$Hz is directed to a third limiter-filter 38 which removes any residual modulation due to noise. The output of the third limiter-filter 38 is a pure tone of $10^3$Hz which is fed into a third phase detector 39. The third phase detector also receives an input signal from the second modulating frequency of $10^3$Hz and makes a phase comparison of the two input signals. The output is a cyclic count of the phase difference in units of hundreds. The output from the third phase detector 39 is directed to the phase shift register 34.

The phase shift register 34 receives inputs from the first, second and third phase detectors. This register synthesizes the cycle count in correct order of digital units. The phase shift register is provided with a zero adjust mechanism 41 and a shift register bias 42. The zero shift mechanism permits one to make a manual adjustment of the phase shift register which permits a cycle count to be set to a specific value under actual operating conditions. The phase shift register bias permits a manual adjustment by which cycle count in thousands may be added to the phase shift register.

The output 43 from the phase shift register is directed to an electronic gate 44. The gate 44 receives signals 45–47 from three other like phase shift registers each of which are controlled by like circuits from each of the receivers 16–18. The gate also receives an output from a magnetic compass 48 whose output is the relative x-y coordinate position of magnetic north with respect to the casing of the instrument. Another input into the gate is received from a digital clock 49 which receives its input from the master oscillator 22. The output of the digital clock is in Julian Date format so that one may be able to maintain a current velocity record by time of operation. The six inputs into the gate consists of the signals from each receiver circuit, phase shift registers, the compass and the clock. The gate transmits the six inputs in a preassigned order or format into an electronic circuit 51 which operates to put the input data from the gate into a suitable data format for reduction by a computer ashore. The data signals from the electronic circuitry 51 are directed into a tape recorder 52 which recorder may be obtained from the instrumentation package by hand and the information fed into a computer ashore.

Another manner of operation is by remote signaling wherein the signals from the electronic storage tapes may be sent over a transmitter to a receiver ashore for recording of the signals and feeding the signals into a computer for obtaining current velocity information.

The master oscillator and each of the separate electronic units are constructed of well known electronic circuits which are well known by one skilled in the art to carry out their intended results as set forth above in the discussion of the various units of the overall system.

This system enables one to measure current velocity from the ultra-low to a velocity producing cavitation around the instrument.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A water current velocity measuring system; which comprises,
   an x-y omnidirectional acoustical signal transmitter,
   two orthogonal pairs of receivers each positioned relative to said transmitter for receiving acoustical signals from said transmitter,
   a high frequency electrical signal producing means,
   a carrier frequency producing means which receives an input from said high frequency electrical signal producing means which produces a subharmonic of said signal received from said high frequency electrical signal producing means,
   a second signal producing means which receives a signal from said carrier frequency producing means which produces a subharmonic of said carrier frequency,
   a third signal producing means which receives a signal from said second signal producing means which produces a subharmonic of the output of said second signal producing means,
   a first amplitude modulating means which receives inputs from said carrier frequency and second signal producing means which produces an output signal which is said subharmonic of said carrier frequency modulated by said subharmonic of said second signal producing means,
   a second amplitude modulating means which receives inputs from said first amplitude modulating means and from said carrier frequency producing means which produces an output which is the carrier frequency with suitable amplitude modulation, said output of said second amplitude modulating means directed into said transmitter for producing an omnidirectional sonic signal in accordance with said modulated input signal with said sonic signal directed to said receivers which converts said sonic signal into electrical output signals, separate means for receiving an output signal from each of said receivers separating the carrier frequency and modulating frequencies into separate signals, phase detector means for making a phase comparison between the original signals and the signals from said receivers and producing a cyclic count of the phase difference between each different signal, a phase shift register for registering the cyclic count for each of said different frequencies for each receiver, a gate means, said gate means receiving a signal from each of said phase shift registers and transmitting said signals in a preassigned order, an electronic means for receiving said signal outputs from said gate and converting said signals into suitable signals for recording by a recording means, and a recorder means for recording said signals produced by said electronic means.

2. A water current velocity measuring system, as claimed in claim 1; which includes, a magnetic compass means that produces an output which is the relative x-y coordinate position of magnetic north with respect to said receivers, and a digital clock for producing an output in Julian Date format whereby said outputs from said compass means and said digital clock are directed to said gate means and are transmitted in order, by said gate means to said electronic means.

3. A water current velocity measuring system, as claimed in claim 2; which includes, a filter limiter in combination with said phase detector for separating the separate frequency signals of the output from said receiver.

4. A method of determining the current velocity of water; which comprises, producing a high frequency output signal, deriving a carrier frequency which is a subharmonic of the high frequency output signal, amplitude modulating said carrier frequency by a first and second modulating frequency, converting said amplitude modulated frequencies into an omnidirectional sonic signal in the x-y plane, and transmitting said signals, receiving the sonic signal by use of four equispaced receivers each positioned equidistant from the transmitter, said receivers converting said sonic signals to electrical signals, demodulating each of the modulated frequencies, comparing the phase of the demodulated frequencies with the modulated frequencies to determine the phase difference between each, registering the phase shift difference, amplifying the phase shift difference and recording the phase shift difference which represents current velocity.

* * * * *